United States Patent
Baumberg et al.

[11] Patent Number: 6,074,071
[45] Date of Patent: Jun. 13, 2000

[54] AQUARIUM LIGHTING SYSTEM

[75] Inventors: Israel Baumberg, Maale Adumim; Oleg Berezin, Jerusalem; Joseph Dvir, Mevasseret Zion; Boris Gorelik, Beit-Shemesh; Alex Kachanovsky, Maaleh Adumim; Marc Prager, Jerusalem; Moshe Voskoboinik, Maale Adumim, all of Israel

[73] Assignee: Elam Electroluminescent Industries Ltd., Jerusalem, Israel

[21] Appl. No.: 09/340,734

[22] Filed: Jun. 29, 1999

[51] Int. Cl.$^7$ ...................................... F21V 33/00
[52] U.S. Cl. ..................... 362/101; 313/506; 362/582
[58] Field of Search .................... 362/101, 582, 362/551, 96; 313/502, 506, 511, 512, 22, 35; 361/690

[56] References Cited

U.S. PATENT DOCUMENTS

| | | | |
|---|---|---|---|
| 3,069,579 | 12/1962 | Berg et al. | 313/511 |
| 3,609,343 | 9/1971 | Howlett | 362/562 |
| 3,749,901 | 7/1973 | Clough | 362/562 |
| 3,819,973 | 6/1974 | Hosford | 313/498 |
| 3,908,598 | 9/1975 | Jewson | 119/267 |
| 4,516,529 | 5/1985 | Lotito et al. | 119/253 |
| 5,067,059 | 11/1991 | Hwang | 362/101 |
| 5,211,469 | 5/1993 | Matthias et al. | 362/101 |
| 5,353,746 | 10/1994 | Del Rosario | 119/266 |
| 5,485,355 | 1/1996 | Voskoboinik et al. | 362/84 |
| 5,546,289 | 8/1996 | Gordon | 362/101 |
| 5,848,837 | 12/1998 | Gustafson | 362/101 |
| 5,869,930 | 2/1999 | Baumberg et al. | 313/506 |

Primary Examiner—Sandra O'Shea
Assistant Examiner—Hargobind Sawhney
Attorney, Agent, or Firm—Browdy and Neimark

[57] ABSTRACT

An illumination system for illuminating an underwater space is presented. The system comprises an elongated flexible electroluminescent light source located substantially inside the underwater space and a power supply unit located outside the underwater space. The power supply unit is connected to one end of the electroluminescent light source. At least this one end of the light source, which is connected to the power supply unit, is located outside the underwater space. The light source has at least one light-emitting element located inside an inner insulating sheath, and has an outer insulating sheaf. The inner insulating sheath and the outer insulating sheath are separated by a continuous air gap coupled to an air region outside the underwater space. This prevents the light source from being affected by water, and thereby from the reduction of its lifetime.

15 Claims, 4 Drawing Sheets

AQUARIUM LIGHTING SYSTEM

FIELD OF TE INVENTION

This invention is generally in the field of decorative illumination, and relates to an underwater illumination system, which is particularly useful for aquarium illumination.

BACKGROUND OF THE MENTION

The decorative illumination of aquariums has been widely used, often employing simple heating lamps or fluorescent lamps accommodated above water. These techniques are disclosed, for example, in U.S. Pat. Nos. 3,908,598; 4,516,529; and 5,353,746. However, it was found that the bright illumination produced by these lamps could cause damage to some kinds of aquarium fish, affect their natural colors, and may cause the discoloration of various colored elements in the aquarium.

There is a great variety of systems utilizing standard lamps for underwater illumination. Unfortunately, these systems are bulky, owing to the unavoidable requirement for a suitable means to prevent the penetration of water into the regions of electrical contacts. This makes such systems unsuitable for decorative illumination.

Illumination systems based on LEDs have been developed, being disclosed, for example, in U.S. Pat. Nos. 5,211,469 and 5,948,837. Notwithstanding the fact that these systems are more miniature than those based on the standard lamps, they suffer from the point-like nature and non-isotropic illumination of LEDs. Additionally, the use of LEDs requires electrical contacts to be located under water which, in turn requires the provision of a special means for preventing water from penetrating the contact region.

Systems for decorative illumination of aquariums utilizing optical fibers as light sources have been developed, and are disclosed, for example, in U.S. Pat. Nos. 3,749,901; 3,609,343; 5,067,059 and 5,546,289. These systems suffer from the drawback associated with the need for a bulky assembly aimed at inputting light into the optical fibers. Such an assembly typically comprises an external light source (i.e., lamp), a drive for rotating spectral filters, etc. Additionally, optical fibers are not sufficiently flexible, and provide the entire radiation output at the butt of the fibers only, that actually make them point-like light sources.

SUMMARY OF THE INVENTION

There is accordingly a need in the art to facilitate aquarium decorative illumination by providing a novel method and system for decorative underwater illumination.

The main idea of the present invention is based on the use of flexible, elongated light sources of a desired length, such as electroluminescent strips or filaments. Due to their high flexibility, such light sources can be desirably patterned within the under water space and coupled to a power source located outside this space.

It has been found by the inventors that in order to prevent a decrease in the lifetime of these light sources, the average relative moisture of the surrounding medium should be maintained at a level less than 70%. To this end, an emitting element of the light source is coated by inner and outer insulating sheaths, which define a continuous air gap therebetween. The air gap freely communicates with an air medium, surrounding the underwater space. The air circulation through this gap will carry away the molecules of water that might have passed through the outer insulating sheath, and bring them outside the air gap, thereby preventing an increase in the average relative moisture in the vicinity of the inner insulating sheath.

There is thus provided according to one aspect of the present invention, an illumination system for illuminating an underwater space, the system comprising:
  an elongated flexible electroluminescent light source accommodated substantially inside said underwater space; and
  a power supply unit accommodated outside said underwater space and connected to one end of the electroluminescent light source, wherein at least said one end of the light source connected to the power supply unit is located outside said underwater space;
    said light source has at least one light emitting element located inside an inner insulating sheath, and has an outer insulating sheath, the inner insulating sheath and said outer insulating sheath being separated by a continuous air gap coupled to an air region outside the underwater space.

The at least one light emitting element may be in the form of a substantially flat strip having at least one light-emitting surface, or in the form of a filament emitting light in all directions.

An opposite end of the light source may be located either inside or outside the underwater space. The end of he light source located inside the underwater space is hermetically sealed from the penetration of water into the air gap. If the opposite end of the light source is located outside the underwater space, this end of the light source is opened for connecting the air gap with the air region outside the space. A compressor may be provided outside the underwater space for intensifying air circulation within the gap.

The electroluminescent light source may comprise more than one light-emitting element, and may therefore be either single or multi-colored, which significantly amplifies the effect of decorative illumination. Each of the light-emitting elements has its own inner insulating sheath, while the outer insulating sheath of the light source is common for all the light-emitting elements.

The outer insulating sheath may be integral with the at least one light emitting element, in which case the light source is non-detachable. The outer insulating sheath may be in the form of a substantially flexible substantially transparent tube having a cross-section such as to be mounted on and removed from an inner side of the light source. In this case, the light source is detachable.

Preferably, the system also comprises a moisture absorber accommodated inside the outer insulating tube.

More specifically, the present invention is used for decorative illumination of aquariums, and is therefore described below with respect to this application.

BRIEF DESCRIPTION OF THE DRAWINGS

In order to understand the invention and to see how it may be carried out in practice, a preferred embodiment will now be described,. by way of non-limiting example only, with reference to the accompanying drawings, in which.

DETAILED DESCRIPTION OF A PREFERRED EMBODIMENT

Figure 1:
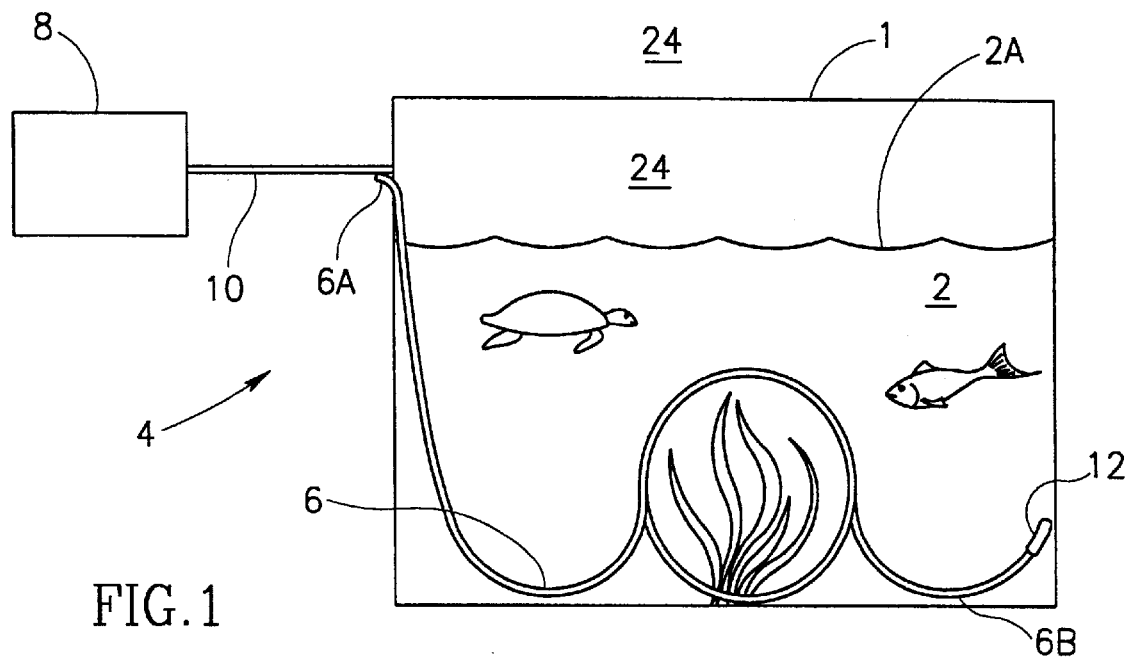
FIG. 1 is a schematic illustration of an aquarium equipped with an illumination system constructed according to one embodiment of the invention.

Referring to FIG. 1, there is illustrated an aquarium 1 partly filled with water defining an underwater space 2, and an illumination system generally designated 4. The system 4 includes an elongated flexible electroluminescent light source 6 whose one end 6A is coupled to an AC power supply unit 8 through an electric wire 10. As shown, the end 6A of the light source 6 is located outside the aquarium 1, above the water level 2A, while an opposite end 6B of the light source 6 is located inside the underwater space 2. A tip 12 hermetically sea the end 6B from the water penetration therein.

The electroluminescent light source 6 operates in the following manner. It has at least one light-emitting element, which typically includes an inner wire electrode coated by dielectric and electroluminescent layers, and an outer electrode in the form of a transparent conducting layer. The supply of alternating voltage with a frequency of about 50–4000 Hz and an amplitude about 50–250 VRMS to electrodes of the light emitting element, causes the emission of light of a certain color (i.e., frequency range), depending on the kinds of electroluminophore and filters used in the light source. The main principles of implementing an electroluminescent light source having one or more light-emitting elements are known per se, being described for example in U.S. Pat. Nos. 5,485,355 and 5,869,930, assigned to the assignee of the present application.

It is generally known that an electroluminescent light source is highly susceptible to damage and malfunction caused by exposure to moisture. This feature hardens its use for applications requiring the accommodation of the light source under water. When surrounding the electroluminescent light source by a transparent flexible insulating layer, the water steam, whilst diffusing therethrough, penetrates into the inner electroluminescent layer, which significantly decreases the lifetime of the light source.

It has been found by the inventors, that the substantial decrease of the lifetime of a light source of the kind specified above occurs within several days when the average relative moisture of the surrounding medium is more than 80%. When the average relative moisture is between 70% and 80%, the changes in its lifetime are negligible, and are not observed at all when the average relative moisture is less than 70%. Hence, to prevent an undesirable decrease in the lifetime of the light source, the average relative moisture of a surrounding medium should be maintained at a level less than 70%. This is implemented in the following manner.

Figure 2:
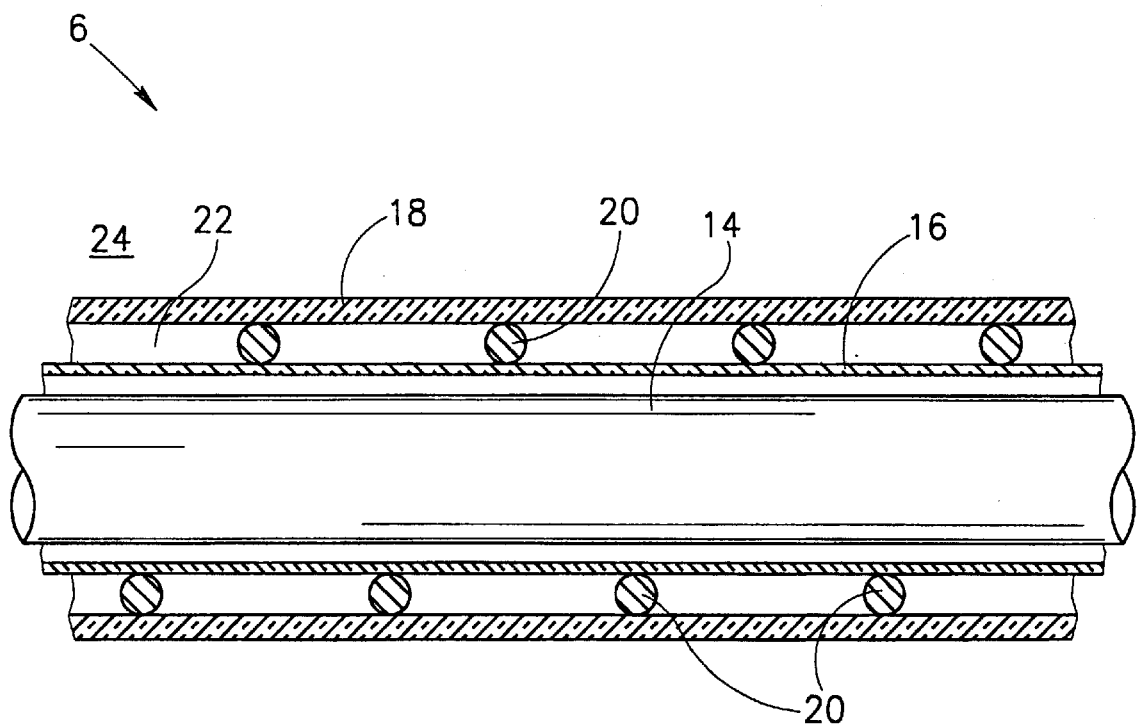
FIG. 2 schematically illustrates one example of a light source suitable for use in the illumination system of FIG. 1.

FIG. 2 is a longitudinal section view of the light source 6 constructed according to one possible example of the invention suitable to be used in the illumination system 4. In this specific example, the light source 6 includes a single elongated flexible light-emitting element 14 which is coated by inner and outer insulating sheaths 16 and 18 spaced-apart from each other by a spacer 20. The inner insulating sheath 16 is made of a flexible transparent polymer material, such as polyethilene, having the thickness of 0.3–0.5 mm. The outer insulating sheath 18 is made of a flexible transparent polymer having the thickness of 0.5–1 mm. The spacer 20 is a polymer thread in the form of a cylindrical spiral having the diameter of 0.4–2 mm, which encloses the inner sheath 16. The inner and outer insulating sheaths 16 and 18 define a continuous air gap 22 therebetween, whose width is approximately equal to the diameter of the spacer 20. This air gap 22 freely communicates with air medium 24, sounding the underwater space 2 (i.e., the aquarium 1).

It is understood that the air circulation through this air gap 22 would result in that the molecules of water, that might have passed through the outer insulating sheath 18, will be carried away by the circulated air flow and will be brought outside the air gap 22. As a result, the average relative moisture in the air gap 22 in the vicinity of the inner insulating sheath 16 becomes close to that of the air at home in which the aquarium 1 is located. The average relative moisture at home is practically less than 70%.

Figure 3A:
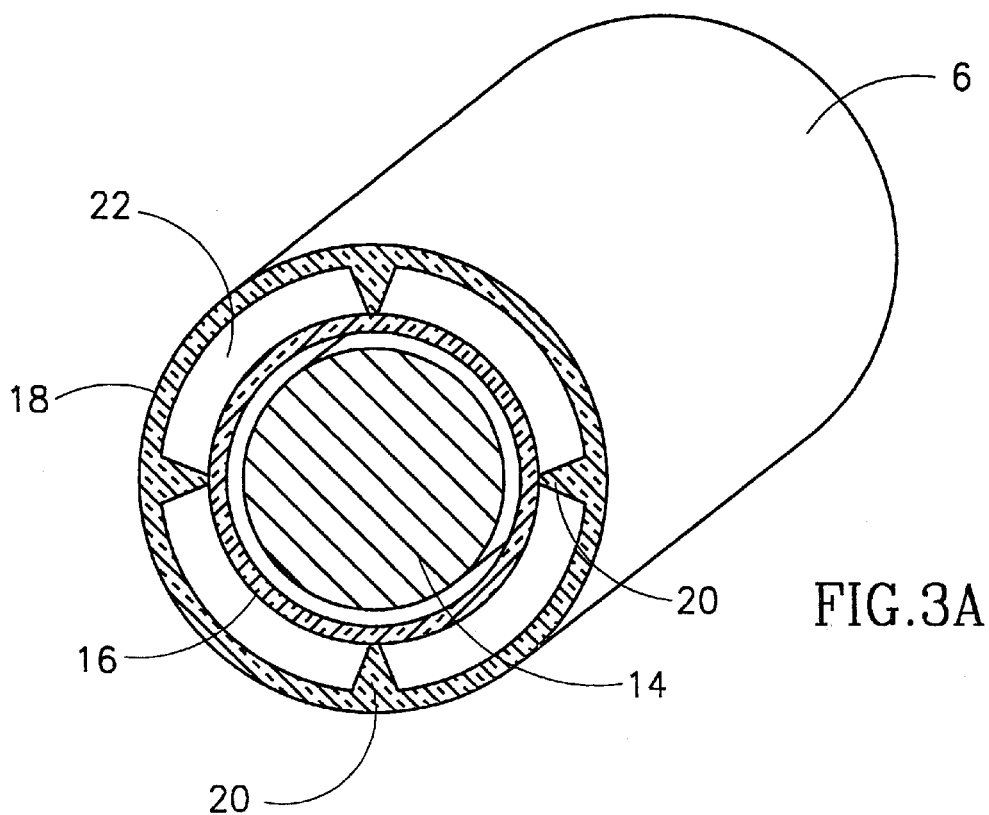
FIG. 3a and 3b schematically illustrate two more examples of the light source suitable for use in the illumination system of FIG. 1.
Figure 3B:
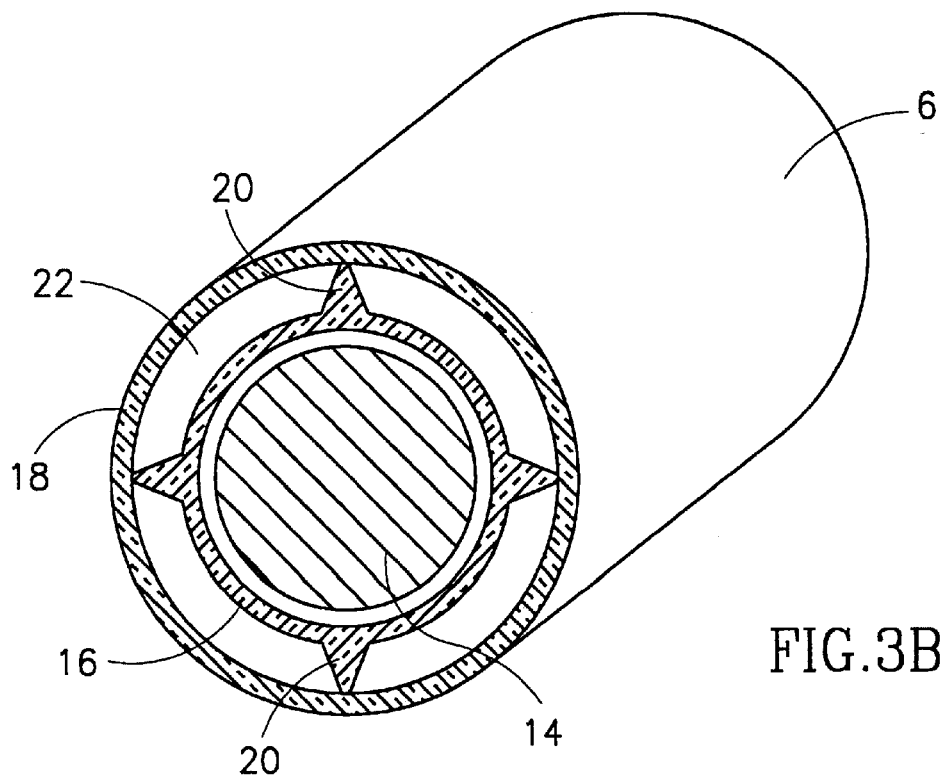

Turning now to FIGS. 3a and 3b, the spacer 20 separating the inner and outer insulating sheaths 16 and 18 is in the form of a strip having a triangular cross-section. The height of the spacer 20 is approximately 1 mm. The spacer 20 is integrally made with either of the insulating sheaths 16 or 18, thereby making the light source 6 detachable and non-detachable, respectively.

In the example of FIG. 3a, the spacer 20 is integrally made with the outer sheath 18 being formed directly on the surface of the inner sheath 16. In this case the light source 6 is non-detachable.

According to the example of FIG. 3b, the spacer 20 is integrally made with the inner sheath 16, and the outer sheath 18 is designed like a flexible transparent polymer tube having the wall thickness about 0.5–1 mm. The inner sheath 16, together with the spacer 20, is installed, inside this tube 18. Consequently, in this case, the light source 6 is detachable.

Figure 4:
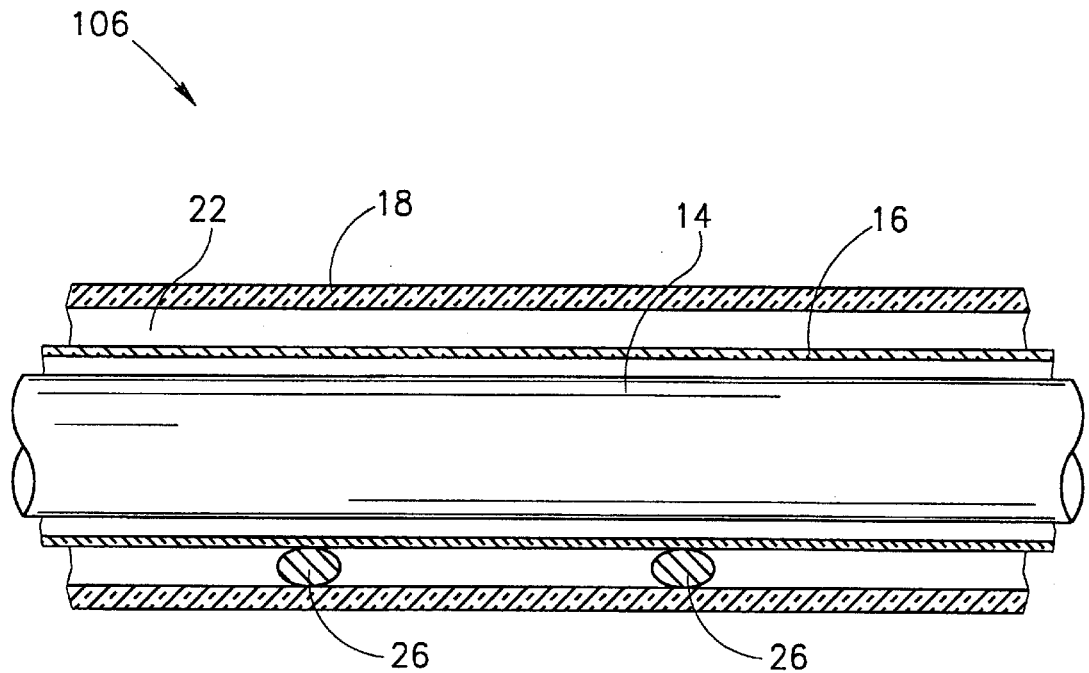
FIG. 4 illustrates another example of the light source of the illustration system of FIG. 1 comprising a moisture absorber.

FIG. 4 exemplifies an electroluminescent light source 106 having a somewhat different construction as compared to the previously described examples. The same reference numbers are used for identifying those components which are identical in the elements 6 and 106. In the light source 106, capsules 26 containing a moisture absorber, for example alumogel, are provided, being accommodated within the air gap 22 in a spaced-apart relationship along the gap. The outer insulating sheath 18 is in the form of a flexible transparent tube. By removing this tube, the capsules 26 could be replaced by new ones, which may be performed once in several months.

Figure 5:
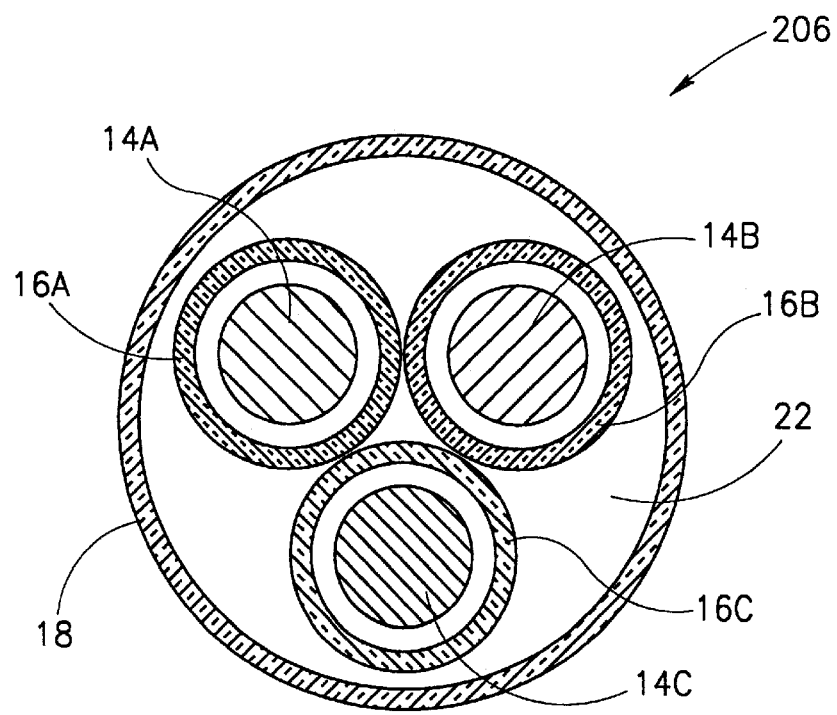
FIG. 5 illustrates yet another example of the light source having several light-emitting elements.

FIG. 5 illustrates yet another example of a light source 206 suitable to be used in the illation system 4. Similarly, to facilitate understanding, those components which are common in the constructions of FIGS. 2, 4 and 5 are identified by the same reference numbers. The light source 206 includes a plurality of light-emitting elements—three in the present example, 14A, 14B and 14C. The light-emitting elements have electroluminophors and different spectral filters proving their luminescence with blue, yellow and red colors, respectively. Each of the emitting elements 14A, 14B and 14C has its own inner insulating sheath designated 16A, 16B and 16C, respectively. All the emitting elements 14A–14C together with their inner insulating sheaths 16A–16C are noted inside the outer insulating sheath 18 of the entire light source 206. The continuous air gap 22 is formed within a space between the inner sheaths 16A–16C and the outer sheath 18.

It should be noted, although, not specifically shown, that the power supply unit 8 may comprise a plurality of programmable connection ports for connecting thereto the emitting elements. This allows for maximizing the decorative illumination effect. Additionally, the illumination system may comprise a sensor means that shifts the system from its operative position to its inoperative position, upon detecting that ambient light reaches a predetermined value.

Figure 6:
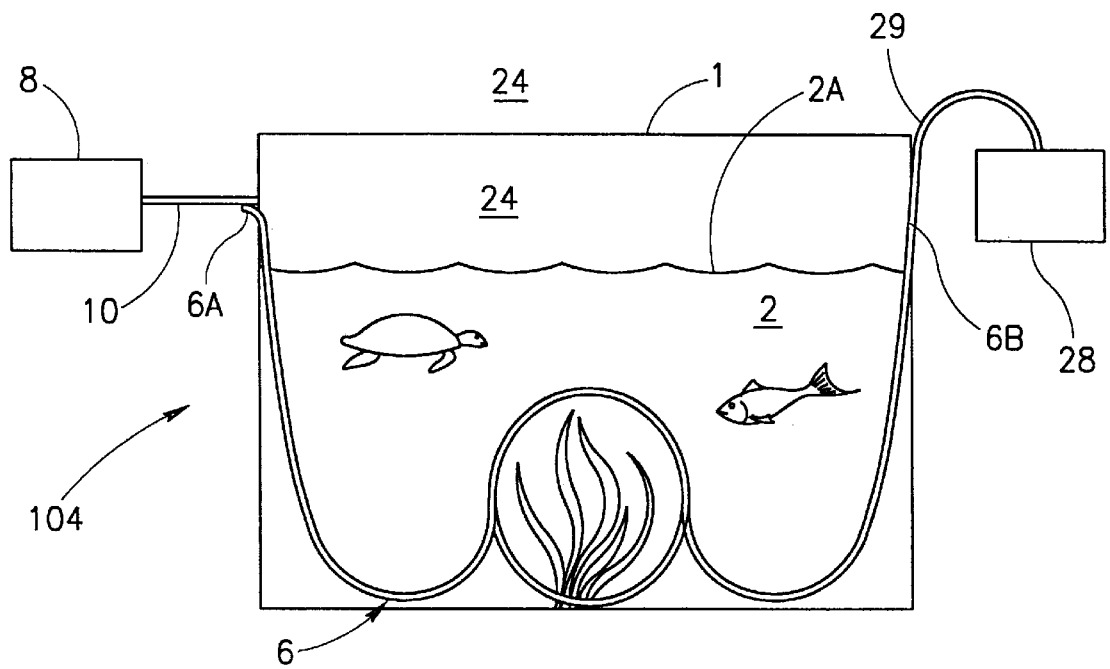
FIG. 6 is a schematic illustration of an aquarium equipped with an illumination system constructed according to another embodiment of the invention.

Reference is now made to FIG. 6, illustrating the aquarium 1 equipped with an illumination system 104 constructed according to another embodiment of the invention. The same reference numbers are used for identifying common components in the, systems 4 and 104. Here, in distinction to the system 4, both ends 6A and 6B of the electroluminescent light source 6 are located outside the aquarium 1, i.e., above the water level 2A. The end 6A is coupled to the AC power supply unit through the electric wire 10. As for the opposite end A, the air gap (not shown here) at this end is coupled to a compressor 28 through a tube 29. Periodical actuation of the compressor 28 provides relatively strong air circulation through the air gap, as compared to that in the absence of the compressor 28, which significantly reduces the possibility of the moisture penetration towards the inside of the light-emitting element of the light source 6. It should be understood, although not specifically shown, that the light source may comprise one or more light-emitting element, being constructed as described above with reference to either of FIGS. 2, 3a, 3b, 4 or 5.

Figure 7:
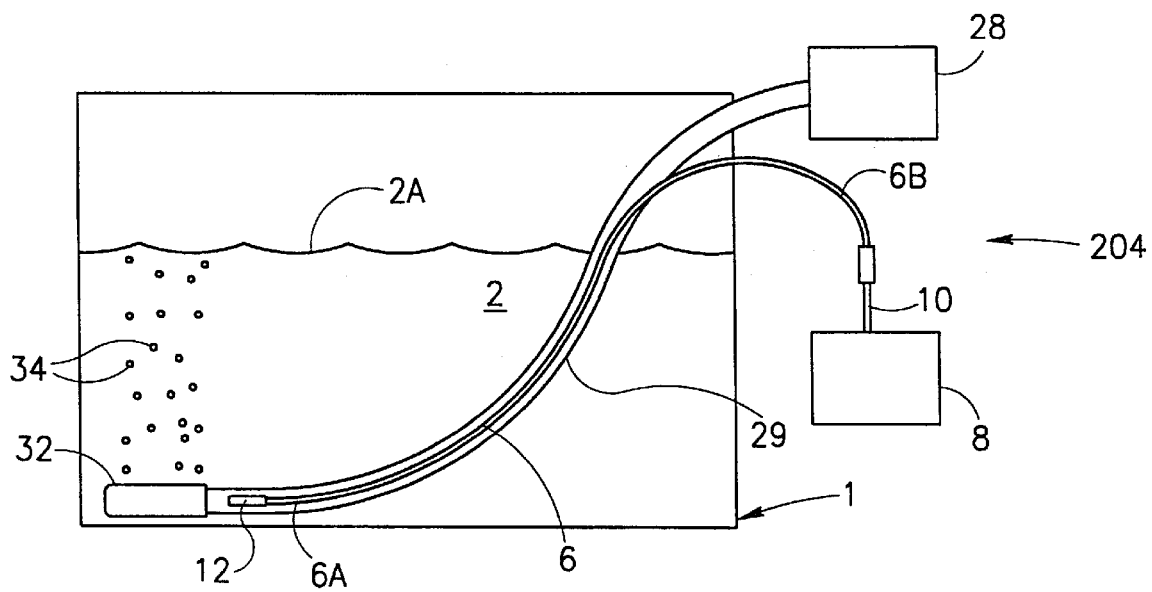
FIG. 7 is a schematic illustration of an aquarium equipped with an illumination system according to yet another embodiment of the invention.

FIG. 7 illustrates an aquarium 1 equipped with an illumination system 204 having a somewhat different construction as compared to the systems 4 and 104. The illumination system 204 is associated with an oxygen enrichment system 30 of the aquarium 1. To this end, the compressor 28 serves for supplying air to a porous tip 32 through the transparent tube 29. Air, in the form of small balls 34 (bubbles), penetrates into the underwater space 2 through the tip 32. The electroluminescent light source 6 is located inside the tube 29. The end 6A of the light source 6 located inside the tube 29 is hermetically sealed by the tip 12, while the opposite end 6B is taken away from the tube 29 so as to be outside the aquarium 1. The electrodes (not shown) of the light source 6 at the end 6B are electrically connected to the power supply unit 8 though the wire 10.

The advantages of the present invention are thus self-evident. The illumination system has a simple construction, and is relatively light in weight as compared to those based on the use of standard lamps and optical fibers. Due to the provision of the continuous air gap between the inner and outer insulating sheaths of the electroluminescent light source, which air gap freely communicates with an air medium surrounding the underwater space, the invented system provides safety means for preventing the light source from being affected by water, and thereby from the reduction of its lifetime.

Those skilled in the art will readily appreciate that various modifications and changes may be applied to the preferred embodiments of the invention, as hereinbefore exemplified without departing from its scope defined in and by the appended claims. For example, the power supply unit may be of any known kind, the use of the AC power supply enhancing the brightness of illumination. The light source may comprise one or more light-emitting elements.

What is claimed is:

1. An illumination system for illuminating an underwater space, the system comprising:
    an elongated flexible electroluminescent light source accommodated substantially inside said underwater space; and
    a power supply unit accommodated outside said underwater space and connected to one end of the electroluminescent light source, wherein
        at least said one end of the light source connected to the power supply unit is located outside said underwater space;
        said light source has at least one light-emitting element located inside an inner insulating sheath, and has an outer insulating sheath, the inner insulating sheath and said outer insulating sheath being separated by a continuous air gap coupled to an air region outside the underwater space.

2. The system according to claim 1, wherein the underwater space is located inside an aquarium.

3. The system according to claim 2, wherein said light source is accommodated inside a substantially transparent tube through which air is supplied into the aquarium.

4. The system according to claim 1, wherein said at least one light-emitting element is a substantially flat strip having at least one light-emitting surface.

5. The system according to claim 1, wherein said at least one light-emitting element is a filament emitting radiation in all directions.

6. The system according to claim 1, wherein an opposite end of said at least one light source is located inside said underwater space.

7. The system according to claim 6, wherein said opposite end is hermetically sealed from penetration of the water into the air gap.

8. The system according to claim 1, and also comprising at least one additional light-emitting element each having a corresponding inner insulating sheath.

9. The system according to claim 8, wherein the light-emitting elements emit radiation of different spectral ranges.

10. The system according to claim 8, wherein said power supply unit has a plurality of connection ports each for connecting the light-emitting element thereto.

11. The system according to claim 1, wherein said outer insulating sheath is integral with said at least one light-emitting element, the light source being non-detachable.

12. The system according to claim 1, wherein said outer insulating sheath is a substantially flexible substantially transparent tube having a cross-section such as to be mounted on and removed from an inner side of the light source, the light source being detachable.

13. The system according to claim 12, and also comprising a moisture absorber accommodated inside said tube.

14. The system according to claim 1, wherein an opposite end of said light source is located outside the underwater space, the ends of the light source being opened for connecting said air gap with the air region outside the space.

15. The system according to claim 14, wherein said air gap is connected to a compressor intensifying air circulation within the gap.

* * * * *